Figure 1:
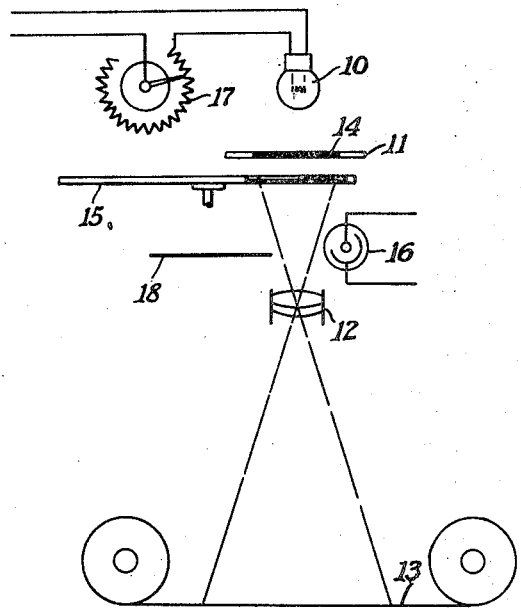

Sept. 12, 1950  C. M. TUTTLE ET AL  2,521,954
APPARATUS FOR MAKING COLOR PRINTS
Original Filed May 10, 1946  4 Sheets-Sheet 1

CLIFTON M. TUTTLE
FORDYCE M. BROWN
INVENTORS

BY 
ATTORNEYS

Sept. 12, 1950     C. M. TUTTLE ET AL     2,521,954
APPARATUS FOR MAKING COLOR PRINTS
Original Filed May 10, 1946     4 Sheets-Sheet 2
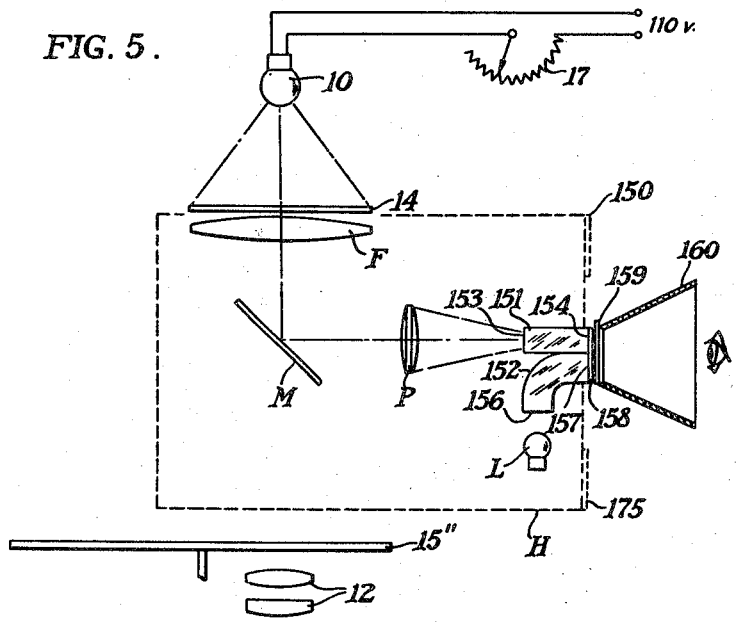
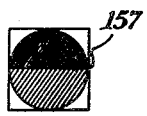
CLIFTON M. TUTTLE
FORDYCE M. BROWN
INVENTORS
BY
ATTORNEYS Sept. 12, 1950  C. M. TUTTLE ET AL  2,521,954
APPARATUS FOR MAKING COLOR PRINTS
Original Filed May 10, 1946  4 Sheets-Sheet 3

CLIFTON M. TUTTLE
FORDYCE M. BROWN
INVENTORS

BY
ATTORNEYS

Sept. 12, 1950  C. M. TUTTLE ET AL  2,521,954
APPARATUS FOR MAKING COLOR PRINTS
Original Filed May 10, 1946  4 Sheets-Sheet 4

CLIFTON M. TUTTLE
FORDYCE M. BROWN
INVENTORS

BY
ATTORNEYS

Patented Sept. 12, 1950

2,521,954

UNITED STATES PATENT OFFICE 2,521,954

APPARATUS FOR MAKING COLOR PRINTS

Clifton M. Tuttle, Huntington Station, and Fordyce M. Brown, Rochester, N. Y., assignors to Eastman Kodak Company, Rochester, N. Y., a corporation of New Jersey Original application May 10, 1946, Serial No. 668,800. Divided and this application August 28, 1947, Serial No. 771,068

27 Claims. (Cl. 88—24)

The present invention relates to an apparatus for making color prints, and this application is a division of our copending application Serial No. 668,800, filed May 10, 1946.

The general object of this invention is to provide an apparatus for readily and automatically carrying out the method of making color prints set forth in our above noted copending application. The apparatus is so designed that color prints can be made by a machine operator who is unfamiliar with the theory of making color prints, rather than requiring the services of an expert in judging the color negative above, or plus a machine operator, as is true of prior art systems. The present apparatus is free from color fatigue while an expert who judges the color prints visually is soon subject to such fatigue in a short time with the result that his judgement starts to fail and poor prints result.

Another object is to provide a color printer which requires only that the operator position the color negative in a negative carrier and then push a button to start the exposure. Thereafter, the printing operation is completely and automatically carried out by the apparatus.

Another object is to provide a color printer which can produce color prints in a rapid manner, the production of the machine being determined by the sensitivity of the paper and the speed of the operator.

The customary method of making color prints on a multi-layer printing material from an integral tri-pack color negative involves the following steps. First, a processed negative is sent to an expert for judging and this step requires the services of an expert who can judge color negatives and tell what combination of filters is required in a color printer to correct for discrepancies in the color balance or over-all hue of the negative in order to obtain a color print having colors rendered correctly therein. The expert puts a code on the margin of each negative judged and which code informs the printer operator what combination of filters to insert into the printing beam for the exposure. Since this judging step is time-consuming and fatiguing, it is customary to judge only one negative, usually the first, on each roll of film and the code applying to this negative is used in printing the entire roll. The practicability of this procedure is dependent on the fact that all pictures on a roll of film are exposed at approximately the same time, or at least under the same lighting conditions, so that any deficiency as to correct color balance, or over-all hue, which might appear in one picture due to improper exposure should apply to all pictures on the roll. While this condition might be true on the average, it will be obvious that it does not hold true for all pictures and it is quite possible that different pictures on the same roll will be exposed on different days and under quite different exposure conditions.

According to the present invention, the total negative transmission for each of the three primary colors (red, green and blue) is integrated and measured individually and the printing source is adjusted until the intensity of each of the transmitted primary colors is equal to a preselected value. The color-sensitive printing material is then exposed for a given time to each of the transmitted primary colors with the intensity as so adjusted. While the exposures with the three primary colors are preferably made successively right after integration, measurement and adjustment as to intensity of the negative transmitted printing beam, the three could be integrated, measured and adjusted as to intensity individually and then the exposure by the three could be made simultaneously. This, of course, would necessitate using three separate printing sources. It will thus be seen that by the present method each and every color negative is integrated and measured rather than only one on each roll as is commonly done with previously known methods.

It will thus be seen that the present method of making color prints is unique in its manner of exposure since we measure and administer the exposure in three increments. We determine by means of separate integrations of red, green, and blue total negative transmissions what the intensity incident on the negative should be for each of these colors. The integrating and measuring means is preferably a light-sensitive cell, although a color comparison densitometer or photometer could be used if desired, and if complete automatic control is not necessary. Red, green and blue filters are successively indexed into the printing beam, or three primary color printing sources are used, for exposure purposes. As the different primary color filters are moved into the printing beam, the integrating and measuring means is also covered by a filter of the same color for measuring purposes. The intensity of the printing source is then varied until the measuring means gives a signal indicating that the intensity of that color coming through the negative is sufficient for printing purposes, and the exposure of the paper by that color is initiated and continued for a given time. This step is then repeated for each of the other primary colors to complete the exposure.

The intensity of the printing beam transmitted by the negative is varied by changing the intensity of the printing source and this is controlled automatically by the output of the light-sensitive cell, if such is used for measuring the transmitted intensity, or is done manually if a densitometer, or the like, is used for measuring the transmitted intensity. Known printing times for each of the three colors are used, and the pre-selected intensity of the transmitted color beams is chosen in accordance with such times, and with the sensitivity of the printing material and the processing solutions to be used kept in mind, to give the proper exposure for each color. The product of time and intensity for the exposure of each color is substantially the same, so that it can be said that the method is one of integrating and printing to "gray." Or, stating it another way, if the same exposure time is used for each color, e. g. two seconds, then the transmitted intensity for each color will be adjusted to substantially the same value so that if all three color beams were mixed a substantially "white" light would result.

Figure 2:
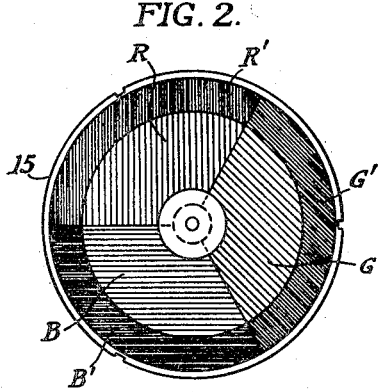
Figure 3:
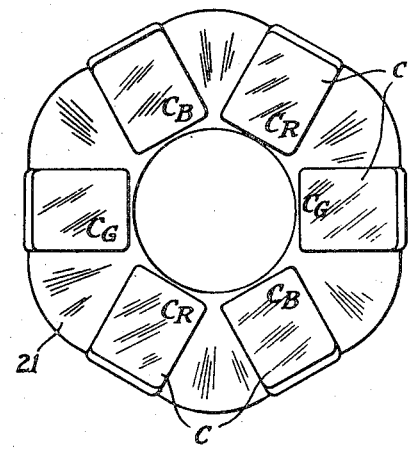
Figure 4:
Figures 6, 8:
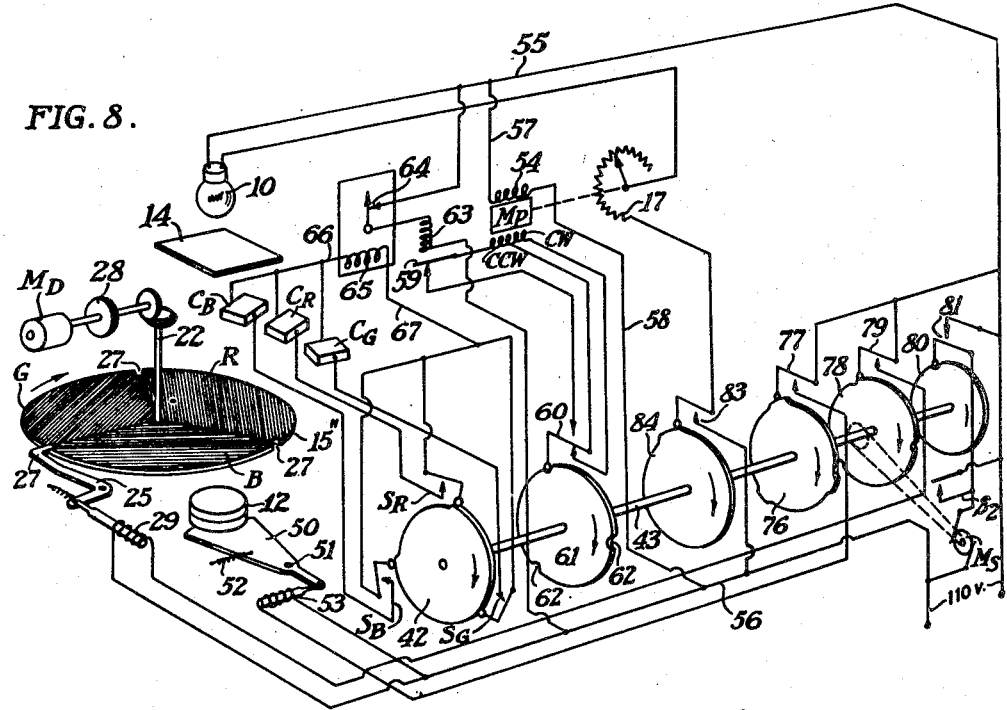
Figure 7:
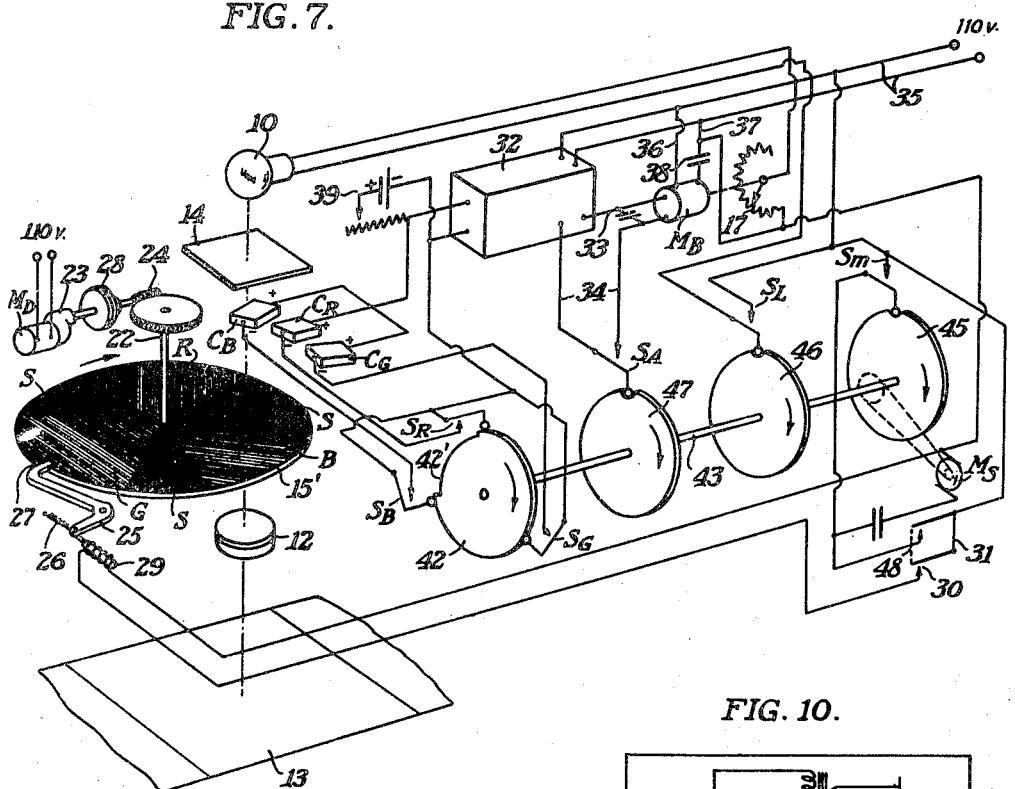
Figure 10:
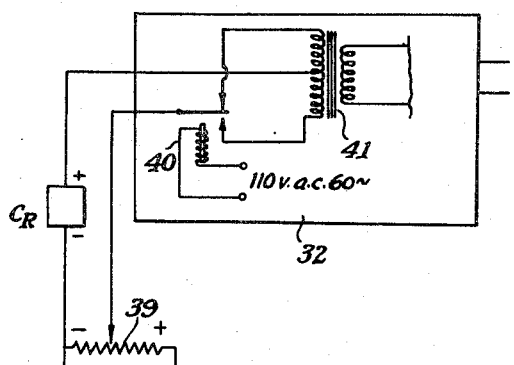
Figure 9:
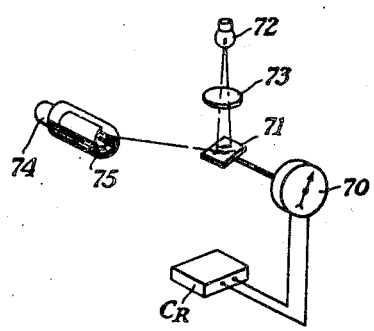

The novel features that we consider characteristic of our invention are set forth with particularity in the appended claims. The invention itself, however, both as to its organization and its methods of operation, together with additional objects and advantages thereof, will best be understood from the following descripion of specific embodiments when read in connection with the accompanying drawings, in which:

Fig. 1 is a diagrammatic showing of an arrangement of parts of a projection printer for carrying out the making of prints in accordance with one embodiment of the present invention, Fig. 2 is an enlarged plan view of a tri-color filter disk which might be used in the arrangement of Fig. 1, Fig. 3 is a diagrammatic showing of another arrangement of parts for a projection printer adapted to carry out the present invention, Fig. 4 is an enlarged plan view of the light-sensitive cell arrangement used in the arrangement of Fig. 3, Fig. 5 is a diagrammatic showing of an arrangement using a densitometer or photometer for integrating and measuring the intensity of the light transmitted by the color negative instead of a light-sensitive means, Fig. 5A is a detail showing the comparison field as it might appear to an operator looking into the viewing hood of the photometer or densitometer arrangement shown in Fig. 5, Figs. 6, 7 and 8 are diagrammatic views, in perspective, of the essential mechanism and circuit organization of different embodiments of an apparatus for carrying out our novel method of making color prints, Fig. 9 is a detail showing the galvanometer hook-up used in the embodiment of the apparatus shown in Fig. 8, Fig. 10 is a diagram showing part of the amplifier used in the servo-mechanism incorporated in the embodiment of Fig. 7, and showing its hook-up with the light-sensitive measuring cell.

Like reference characters refer to corresponding parts throughout the drawings.

Referring now to Fig. 1, our method of making color prints involves the use of a standard projection printer having a "white" light source 10, a negative carrier 11, a projection lens 12 and means, not shown, for holding a sheet of color-sensitive printing material 13 in the focal plane of the lens. The color negative 14 to be printed is placed in the negative carrier, and as well known, the printing source should be diffused by any suitable means, such as by placing a sheet of opal glass, not shown, between it and the negative and preferably close to the negative carrier.

According to the present invention, a filter disk 15, which may be of the type shown in Fig. 2, is disposed between the negative and the lens 12 and includes three filters, one of each of the primary colors red, green and blue, designated R, G, and B respectively, which may be individually indexed into the printing beam to spectrally select the separate colors from the beam transmitted by the negative for exposure purposes. When making a color print, the filter disk is first indexed to place the red filter R in the printing beam and the color sensitive paper is exposed to red light for a given time. Then the filter is successively indexed to position the green and blue filters, G and B, in the printing beam and the same paper area is successively exposed to each of these colors for a given length of time. When the paper has been exposed to each of the three primary colors for the selected times, the exposure is completed and the print is ready for processing.

According to our method, the printing time for each of the primary colors is fixed and the intensity of the light source is varied in accordance with the color balance of the negative so that the paper is given the same exposure for each of the three colors. To do this, a light-sensitive cell 16 of the photoemissive type is disposed adjacent the lens in a position which enables it to receive light passed by the negative. This cell is alternately covered by red, green and blue filters in the same order as the printing beam, and as a convenient way of accomplishing this, we have shown the filter disk 15 having filter areas R', G', and B' at the outside edge of each of the filter areas R, G, and B, which are adapted to spectrally select the primary colors from the negative transmitted light striking the cell, but located so as not to affect the printing beam. Separate red, green and blue filters are shown in the printing beam and the measuring beam because the filters covering the lens and photo cell are not necessarily of the same spectral transmission characteristics. They are, in fact, preferably such that the product of the relative photo-cell sensitivity at each transmitted wave length and the filter transmission at that wave length shall equal the product of paper sensitivity at each wave length times the lens filter transmission at that wave length. In other words, the filter factor between the lens and cell filters, R and R', G and G' and B and B', is adjusted so that the cell sees the different colored negative transmitted light in the same way that the color-sensitive paper sees it.

After a given color filter, R and R', for example, has been indexed into position over the lens and cell respectively, the cell integrates the red light transmitted by the negative and begins to measure its intensity. The intensity of the printing source is then varied by the use of a rheostat 17 until the cell gives a signal that the intensity of the light is sufficient. Then the exposure of the paper by that color light, red by way of example, is started and maintained for a pre-selected time. To prevent the paper from being exposed during the time the intensity of the light is being adjusted, and to cut off the printing beam during the indexing of the different color filters, a shutter 18 is provided, and which shutter swings into and out of in front of the projection lens 12. The cell 16 may be connected to a meter, not shown, and the rheostat 17 may be driven by hand to bring the meter reading to a given value. However, in order to make the printer automatic we prefer to have the rheostat motor driven and to have the motor circuit controlled by a signal initiated by the cell when the intensity of the transmitted light is a given value, as will be described more fully in detail when describing the apparatus shown in Fig. 9. The intensity of the printing source may be adjusted in any one of a number of ways other than that illustrated, for example, by means of an adjustable diaphragm, a rotatable density wedge, moving the light source to and from the negative carrier, by the use of pairs of polarizing filters, etc.

In Fig. 3 we show another and preferred embodiment of the printer structure, although the principle of operation is substantially the same as with the embodiment above set forth. In this arrangement a plurality of barrier layer type photoelectric cells is used to determine the printing intensity of each color transmitted by the negative instead of a single photoemissive type cell as used in the embodiment of Fig. 1, and we believe their use presents the following advantages:

(1) In accuracy and stability of photometric determination such cells are capable of an order of photometric discrimination that is difficult to achieve by any other method.

(2) Because of the physical shape of such cells, they are easy to arrange in a manner that will do a better job of negative integration (speaking of spacial rather than optical transmission integration) than is possible with photoemissive cells.

(3) Their spectral response characteristics are such that the selection of optical filters to equalize color photographic and photoelectric response is easier than with existing photoemissive cells.

(4) They are essentially low resistance elements ($10^3$ for barrier layer cells or $10^{10}$ for photoemissive cells) and as such are subject to less output variation with ambient humidity than are photoemissive cells.

(5) The output of barrier layer cells is easily utilizable for control purposes because of the existence of commercially available rugged instruments among which may be cited:

(a) The D'Arsonval galvanometer photoelectric relay.
(b) The galvanometer type critical current contacting relay, e. g. the Weston Sensitrol Relay, and
(c) A vibrator modulated A. C. amplified servomechanism which is made by the Brown Instrument Company, a division of Minneapolis-Honeywell Regulator Company.

In the embodiment shown in Fig. 3, the printer is shown as including a light source 10 in front of which the color negative 14 is placed to have its image projected by a lens 12 onto a sheet of color sensitive printing material located in the focal plane of the lens. As before, the printing beam is adapted to be cut by a filter disk 15' carrying a red, green and a blue filter, surrounding the printing beam above the filter disk is an annular support 21, the walls of which are inclined towards the negative plane as shown. On the inside face of the walls of this support are fixed in spaced relation a plurality (six being shown) of barrier layer type cells C. Each of these cells is directed towards the negative and an efficient spacial integration of the negative is assured (see Fig. 4). The face of each of these cells has a color filter fixed in covering relation therewith, and diametrically opposite ones of each pair of cells are covered by a filter of the same color. As shown in Fig. 4, the two cells marked $C_R$ have red filters over them, and the two marked $C_B$ have blue filters over them while the two marked $C_G$ have green filters over them, so that each pair is sensitive to only one of the primary colors and is used to integrate and measure the negative transmission of separate ones of these colors. This particular disposition and pairing of cells of the same color provides efficient spacial integration of the light passing through the entire negative, but it will be appreciated that any number of cells could be used for integration and measuring purposes. Throughout the specification and claims, when we refer to "integration" of the light transmitted by a negative, we mean that all of the light transmited by all parts of the negative is collected together for the measurement of its intensity, as distinguished from scanning individual points or areas of the negative to this end.

As before, the spectral transmission characteristics of the filters over the cells are not necessarily the same as the filters covering the lens, but are such that a given color (red for instance) will look the same to the cell as to the paper. By knowing or determining the spectral response of the color-sensitive paper for the three primary colors and determining the spectral response of the cells for each of the colors, filters for the lens and cells can be selected whose relative transmissions at different wave lengths is such that a given color will look the same to the cells as to the paper. Each pair of cells sensitive to the same color are connected together in series or parallel so that their output adds up, and the respective pairs of light cells are adapted to be connected into a control circuit by a commutator in proper timed relation with indexing of the filter disk 15' over the lens, as will be fully set forth in describing the apparatus shown in Figs. 7 and 8. Thus when the red filter is moved over the projection lens for printing with red light, the red sensitive barrier layer cells $C_R$ will be connected in circuit with the control system, which by the way may only be a meter to measure the output of the cell if manual control of intensity is used, to integrate and measure the total negative transmission of red light and to determine the intensity of the red light necessary to print the given negative under consideration. This arrangement thus does away with the mechanical synchronization of two separate tricolor filters, one for the lens and one for the measuring cell, in addition to allowing more efficient spacial integration and measurement of the total negative transmission.

Referring now to Fig. 7, a preferred embodiment of an apparatus for automatically carrying out our novel method of making color prints will be described. This apparatus uses the barrier layer type photocells for integrating and measuring the intensity of the different colors transmitted by the negative, and for purposes of clarity only a single red sensitive cell $C_R$, a single green sensitive cell $C_G$, and a single blue sensitive cell $C_B$ are shown for this purpose. This printing apparatus includes the "white" light source 10 whose intensity is variable by the rheostat 17. The color negative 14 is positioned between the light source and a projection lens 12 which is adapted to project an image of the negative onto a color sensitive paper 13 which can be fed into and held flat in the focal plane of the lens by any suitable means, not shown.

A combination filter and shutter disk 15' is adapted to cover the lens, and comprises the three primary color filters (R for red, G for green, and B for blue) spaced apart by opaque shutter areas S which are adapted to cut off the printing beam completely. With this arrangement, the disk 15' is adapted to be driven continuously from the time an exposure is started until it is completed the speed of the disk drive and the relative width of the filter and shutter areas being such that a given exposure with each color is given the paper during the interval taken for each filter to move across the printing beam, and the shutter areas cutting off the light sufficiently long to permit the substitution of a measuring cell of different color sensitivity for the one previously used and to permit this newly selected cell to integrate and measure the light transmitted by the negative and cause an adjustment of the intensity of the transmitted light to a pre-selected value for printing purposes.

The drive for the disk 15' is shown as comprising a motor $M_D$ which is connected to the shaft 22. Inasmuch as the disk 15' must rotate very slowly, one revolution for each complete exposure, and which is about 10 R. P. M., a reduction gearing, shown here as a reducing unit 23 on the motor and a worm and wheel drive 24 at the shaft 22, must be provided. Inasmuch as this disk 15' must be automatically stopped after a complete revolution of the disk 15' to permit the insertion of a new negative into the printer, a pivoted pawl 25, normally biased by a spring 26 into contact with the periphery of the disk 15', is adapted to snap into an indexing notch 27 in the periphery of the disk to positively hold the same against rotation. To permit the disk to be stopped without stopping the motor $M_D$ a tendency drive clutch 28 is inserted in the drive between the motor and the disk. While this clutch 28 may be one of the friction type, since the disk 15' is light and imposes very little work on the drive, inasmuch as the speed of rotation of the disk in this embodiment is critical, because it determines the exposure time, a single revolution clutch of the ball-and-cam slot type which gives a positive drive is recommended. Such a single revolution clutch is fully disclosed in U. S. Patent 1,933,831, which issued November 7, 1933, to C. Tuttle et al. The pawl 25 is adapted to be momentarily withdrawn from the notch 27 when a solenoid 29 is momentarily energized by the closing of contacts 30 of a double-pole manually-operated starting switch 31 of the apparatus.

In this apparatus a servo-system is used to control the intensity of the printing source 10. This involves connecting a standard or compensating source of potential in bucking relation to the output of the measuring cells to provide a null photoelectric system, and feeding the output of the cells and compensating source to a servo-amplifier the reversible motor of which adjusts the intensity of the printing lamp until the output of the measuring cell is equal and opposite to that of the compensating source. A specific servo-mechanism which we have found suitable for the purpose consists of a vibrator modulated A. C. amplifier shown at 32, the output of which is connected by lines 33 and 34 to one winding of a 2-phase reversible motor $M_B$, which will be conveniently referred to as a balancing motor, and which motor is connected to the rheostat 17 to drive the same in both directions. The other winding of the balancing motor $M_B$ is connected to a 110 v. line 35 by feed lines 36 and 37, line 37 having a condenser 38 therein to throw the current and voltage in the line 90 degrees out of phase for starting purposes. The amplifier also has an input from the 110 v. source through line 35.

A standard, or comparison, source of potential 39 is connected in bucking relation with any one of the three barrier layer type photocells $C_R$, $C_G$, or $C_B$, the respective cells being connected into the circuit by the closing of switches $S_R$, $S_G$, and $S_B$. Although the amplifier unit per se constitutes no part of the present invention, enough of its circuit is diagrammatically illustrated in Fig. 10, along with the cell input circuit, to illustrate how it functions. The amplifier includes a vibrator 40 which is synchronized with the 60-cycle line and chops the input from the measuring cell $C_R$, which may happen to be in circuit at the time, and a comparison source 39 into pulses which because of the transformer 41 are 180° out of phase with each other. If the output in the photo-cell is the larger, the balancing motor $M_B$ is caused to run in such a direction as to decrease the intensity of the printing light until the output from the cell equals that of the compensating source. When this point is reached, there will be equal pulses from the cell and comparison source 180° out of phase and the balancing motor will stop. The same happens if the output from the photo-cell is smaller than that of the compensating source, the balancing motor driving in the opposite direction, however, to increase the intensity of the printing source. The value of the compensating source 39 is determined in accordance with the sensitivity of the printing material and the processing procedure to be used for processing the print so as to call for an intensity of each of the negative transmitted colors necessary to the best exposure conditions.

The printer control is initially adjusted in either one of two ways. One way consists of using the printer to make a color print from an ideal color negative and using samples of printing material from the batch to be ultimately used in the printer and using the processing solutions to be used in processing such prints. Then choosing a fixed exposure time for each color, e. g. two seconds for each color, the compensating source is adjusted until it calls for an intensity of the respective colors transmitted by the negative to produce the best possible print from this negative. The other way consists of using a uniform gray density for the negative and then adjusting the compensator source until the printer gives a uniform gray print from the negative. The initial adjustment of the machine takes into account the color sensitivity of the printing material to be used, as well as the effect of the sensitivity of the paper of the processing procedure to be used. Since no two batches of printing material or processing solutions will show the same color sensitivity, it is recommended that any time that a new batch of printing material is to be used, or the processing solutions are to be changed, that the printer be readjusted.

While adjustment of the compensator source will usually be capable of taking care of changes in the sensitivity of the printing material and/or processing solutions, if the differences in sensitivity involved are not too great, a change in the factor of the color filters over the cell relative to those movable over the lens may have to be considered.

The three measuring cells $C_R$, $C_G$ and $C_B$ are cut into the control circuit in proper timed relation with the rotation of the filters over the lens by means of a cell selecting cam 42 fixed to a cam shaft 43 driven at a known rate of speed by a motor $M_S$. The switches $S_R$, $S_G$ and $S_B$ for cutting the respective cells into the control circuit are disposed around the cam at 120° in relation to one another and each includes a roller which rides on the cam. These switches are spring-pressed closed but are held open by the major portion of the cam. The cam includes an arcuate cut-out portion 42' which allows the switches to close in succession, and the cut-out portion is of such length as to allow each cell to remain in the control circuit sufficiently long to measure the intensity of the printing source to bring the intensity of the transmitted color to the preselected value. The measurement of the negative transmitted light and the adjustment of the intensity of the printing lamp to bring the intensity of the transmitted light to a given value is accomplished rapidly, actually in a small fraction of a second, but one of the cells must be kept in the circuit at all times so that the circuit to the balancing motor $M_B$ is complete, or otherwise the output of the compensating source 39 will tend to drive the intensity of the printing source to its peak.

The drive for the cell selecting cam 42 and the cam itself are arranged to synchronize the selection of the different measuring cells in timed relation with the corresponding color filter in front of the lens. For instance, when the red filter R passes from in front of the lens at the end of the exposure with red light and the shutter areas between it and the green filter passes in front of the lens, the selecting cam 42 should cut out the red measuring cell $C_R$ and cut in the green measuring cell $C_G$. Then this latter cell integrates and measures the intensity of the green light transmitted by the negative and causes the servo-mechanism to adjust the intensity of the printing source until the intensity of the transmitted green light is a pre-selected value. This is accomplished by the time the green filter G of disk 15' starts to move over the lens so that the green exposure time is determined by the time it takes the green filter to move across the lens. This is repeated for each of the colors in succession to make a complete exposure.

After the printing material has been exposed successively to the three different primary colors, or the entire exposure is complete, it is desirable to stop the printer control completely to permit a new color negative to be placed in the negative carrier and to permit a new sheet of printing material to be moved into exposing position. Since the cam shaft makes one revolution for a complete exposure, this can be accomplished by means of cams on said cam shaft controlling switches to the respective parts of the control. First of all, a cam 45 on the cam shaft allows a switch $S_M$ in the circuit of the motor $M_S$ driving the cam shaft to open when the shaft has made one R. P. M. A cam 46 on the cam shaft allows a switch $S_L$ in the lamp circuit to open at the end of each exposure so that the lamp is not used when negatives are being changed or when the printer is not being used. And a cam 47 on the shaft allows a switch $S_A$ in the line 34 to the balancing motor $M_B$ to open so that the balancing motor is shut off when no exposure is being made.

Also at the completion of the exposure the pawl 25 drops into the notch 27 in the disk 15' to stop it, this disk being stopped with a shutter area S over the lens and with the red filter R to be moved over the lens after a fraction of a second needed to measure the intensity of a transmitted light of the next negative and also needed to properly adjust the intensity of the printing lamp for exposing the paper to red light. This is the condition shown in Fig. 7. The switch $S_M$ in the motor circuit is momentarily shorted by the contacts 48 of the double-pole manually-operated starting switch 31 whereupon the cam shaft starts and the cams 46 and 47 close the switches $S_L$ and $S_A$ to turn on the lamp and connect the balancing motor $M_B$ to the amplifier. Also, when the starting switch 31 is manually pulsed the solenoid 29 is energized to pull the pawl 25 from the notch 27 in disk 15' and this disk immediately begins to turn by virtue of the one revolution clutch 28. It will thus be seen that all that is required of the operator in making a color print from a color negative is to place the negative in the negative carrier, then push the start button controlling the starting switch 31. From then on the parts of the printer control starts from the position shown in Fig. 7 and automatically makes the correct exposure of the printing material with red, green and blue light successively and stops after the exposure is completed.

It is believed from the above description that the operation of this embodiment of the printer will be readily understood by those skilled in the art. However, by way of review the following description of the cycle of operation is given to elucidate the operation of this apparatus. Pushing the start button causes the cam shaft to rotate one turn in a given time, for instance, eight seconds, the drive motor breaking its own circuit after a 360-degree rotation of the cam shaft. The red filtered integrating and measuring cells are switched to the amplifier input and the servo-motor drives the rheostat in the printing light circuit in the proper direction to effect a balance between the measuring cell output and compensating source output. Two-thirds of a second is allowed for this integration and lamp adjusting, after which time the shutter area S moves from in front of the lens and the paper is exposed for two seconds while the red filter R is moving across the lens. As the next shutter area S moves over the lens, the amplifier input is transferred from the red to the green filtered cell and this cell measures the intensity of the negative transmitted green light and the servo-motor again adjusts the printing lamp voltage until the integrating cell output equals that of the compensating source. The paper is then exposed to green light for two seconds as the green filter moves across the lens, and the cycle is then completed in a similar manner with the blue filtered integrating cell cut into the circuit in place of the green cell.

In Fig. 8 we have shown another embodiment of a printer control which operates on the same principle as that described, but which differs therefrom in the mechanical elements involved in the control. Accordingly, like parts in these two embodiments will be designated by the same reference characters while the parts which are different have new reference characters.

As before, this embodiment comprises a printing lamp 10 whose intensity is controlled by a rheostat 17 and a projection lens 12 which projects an image of a color negative 14, positioned below and adjacent the lamp, onto a sheet of color-sensitive printing material, not shown. In this embodiment a filter disk 15" having three separate sector color filters, a red one R, a green one G, and a blue one B, is mounted to rotate the three filters successively in front of the lens. This filter disk 15" is constantly driven by a motor $M_D$, but in this instance a reduction gearing is not needed and preferably is not provided, because the filter disk is merely indexed between three positions in each of which a different color filter is positioned over the lens, each of the filters remaining stationary in the printing beam during the integrating and exposing time. As before, a slip, or single revolution, clutch 28 is provided in the disk drive so that the disk can be positively stopped and started at desired times. The disk is indexed by a pivoted pawl 25 which is adapted to snap into notches 27 in the periphery of the disk and stop the disk with successive ones of filters R, G, and B over the lens. The pawl 25 is momentarily released by energization of the solenoid 29.

In this embodiment the printing beam is adapted to be cut off from the paper during indexing of the filter, and during integration and adjustment of the intensity of the negative transmitted light, by a shutter 50 pivoted at 51 and normally biased to a position in front of the lens by a spring 52. This shutter is adapted to be removed from in front of the lens by energization of a solenoid 53. As before, the light transmitted by the negative 14 is adapted to be integrated and measured successively by three barrier layer type photocells each covered by a filter of one of the three primary colors. The red-sensitive cell is again designated as $C_R$, the green-sensitive one by $C_G$, and the blue sensitive one by $C_B$, and the transmission characteristics of the cell filters is again adjusted so that the cells see the different colored lights in the same way as the color-sensitive paper will see them. The output of the measuring cells $C_R$, $C_G$ and $C_B$ are again adapted to control the adjustment of the intensity of the printing lamp and are successively connected into the control circuit by a selecting cam 42 which controls the successive closing of the three switches $S_R$, $S_G$ and $S_B$. As before, this cam is fixed to a cam shaft 43 which is driven at a known rate of speed by a motor $M_S$.

As distinguished from the operation of the first embodiment which used a servo-mechanism to control the intensity of the printing lamp, the operation of this arrangement is based on the principle that prior to the adjustment of the negative transmitted intensity of each color by the cells, the rheostat in the printing lamp circuit is rotated in a direction to turn off the lamp, or preferably, just reduce it to a value which will produce an intensity lower than might be required by the thinnest negative which might be encountered. This step is accomplished during the indexing of the filter disk and when a new filter is in position then the motor driving the rheostat is reversed to uniformly and rapidly increase the intensity of the light. The motor cell in circuit says that there is sufficient light being transmitted by the negative to make the exposure with the color in question and the output of the cell causes the rheostat motor to be stopped. The lamp is held at this intensity during the exposure with this color. When the exposure with a color is completed, the rheostat motor is reversed to drive the lamp intensity down, the next color filter is indexed into printing position, and the procedure is repeated for printing with this color light.

Referring back to Fig. 8, the rheostat 17 is driven by a conventional shaded pole, reversible motor $M_P$ the main winding 54 of which is connected across the feed lines 55 and 56 from a 110 v. supply by leads 57 and 58, respectively. The circuit of the shading windings CW and CCW of the motor $M_P$ includes a normally closed main switch 59 which controls the entire circuit and a double-pole switch 60 which serves to complete alternate ones of the shading winding circuits. The shading windings are designated CW and CCW to indicate the direction of drive of the motor $M_P$ in accordance with the position of the rheostat 17 shown in the drawing. In other words, when the circuit of the shading coil CW is completed and the motor is driving in a clockwise direction the rheostat is driven clockwise to put more resistance in the lamp circuit and decrease the intensity of the printing lamp. The reverse is true when the circuit of shading winding CCW is completed, or the lamp intensity is increased.

The double-pole, or direction, switch 60 is normally spring pressed to the position shown in the diagram and in which the motor drives in a direction to decrease the intensity of the printing lamp. The operating arm of this switch includes a roller engaging a motor direction cam 61 fixed to the cam shaft 43 and which cam includes three spaced recesses 62 which allow the switch 60 to assume its normal position three times during each rotation of the shaft and which throws the switch to, and holds it in a position which causes the motor to drive the lamp intensity up during the remaining portions of the shaft revolution. The cam is so synchronized with the rest of the apparatus that the switch 60 drops into a recess in the cam and the lamp intensity is driven down at the end of an exposure with one color light and during the indexing of the filter disk to the succeeding color and the selecting of the proper measuring cell. Then the cam throws the switch 60 to its other position and the motor reverses to drive the intensity of the printing lamp up until the output of the photo cell stops the motor when the negative transmitted intensity is sufficient for printing purposes.

The motor $M_P$ for driving the rheostat is stopped when normally closed switch 59 is opened. According to this embodiment the opening of the switch is affected by a relay coil 63 energization of which is controlled by a galvanometer controlled switch 64, the coil 65 in the galvanometer being connected to the measuring cell circuit by leads 66 and 67. The galvanometer would not operate the switch directly as indicated in the diagram, but the principle of operation is correct as shown and this showing is used for the purpose of clarity in connection with a diagram of the type shown. Actually, if a galvanometer of the D'Arsonval type is used, the hook-up would be as shown in Fig. 9. The output of the measuring cell $C_R$, for instance, would be connected to the coil of the galvanometer 70 and in accordance with the strength of the cell output. The light beam from a light source 72 would be directed by a lens 73 onto the mirror. The switch 64 and relay coil 63, shown in the diagram of Fig. 8, would be a standard photoelectrically operated relay operated by response of a photoelectric cell when struck with light. In Fig. 9 this photoelectric cell for actuating the relay is shown at 74 and is partially shielded by an opaque film or shutter 75 across which the beam from the mirror 71 moves as the galvanometer is energized. The instant the mirror swings far enough to move the reflected beam past the edge of the opaque shield 75 and the beam strikes the cathode of the photo cell 74 the relay is energized to open switch 59, (see Fig. 8), to stop the driving motor. The parts will be so arranged and adjusted that the mirror of the galvanometer will swing sufficiently to move the reflected beam of light past the opaque shield 75 of cell 74 the instant the intensity of the light transmitted by the negative is equal to the prescribed value necessary for proper exposure of the negative to the color light in question.

The measurement of the intensity of the negative transmitted light and the necessary adjustment of the intensity of the printing light is accomplished very rapidly so that sufficient time is left for exposure with that color light before the direction selecting cam 61 moves sufficiently far to operate switch 60 and reverse the motor $M_P$ to drive the lamp down in intensity in preparation for measuring and adjusting the intensity of the transmitted light for the next color filter.

Immediately after the exposure with any color light the cam 76 on the cam shaft 43 opens the switch 77 in the circuit of the shutter operating solenoid 53 so that the shutter 50 is allowed to move over the lens under the action of its spring 52. The shutter is allowed to remain closed until the filter disk 15'' is indexed to move the next color filter over the lens, until the proper color measuring cell C is connected into the control circuit, and until the control has adjusted the intensity of the printing lamp for the color in question. Then the cam 76 allows switch 77 to close and the shutter 50 is moved out of the light beam and held out sufficiently long to make the desired exposure. This procedure is repeated three times for each complete exposure, once for each of the three primary color exposures, and the three lobes on cam 76 control this sequence of operation in proper timed relation.

The filter indexing cam 78 connected to the cam shaft 43 allows the switch 79 in the circuit of the solenoid 29 to momentarily close three times during each complete tri-color exposure, once after the exposure with each color, whereupon the pawl 25 is pulled from one of the notches 27 on the filter disk 15'' permitting the same to be picked up and driven by the motor $M_D$. Since this solenoid is only momentarily energized, the pawl will be free to snap into the succeeding notch on the disk 15'' to stop the same with the next color filter in covering relation with the lens.

The cam shaft 43 makes one revolution for each complete tri-color exposure and it is automatically stopped at this time by a cam 80 fixed on the cam shaft which allows switch 81 in the circuit of the drive motor $M_S$ to open. The printer is started by manually pulsing the push button switch $S_2$ which in turn short-circuits switch 81 to allow the motor to start. After the motor $M_S$ starts the cam 80 closes switch 81 and holds it closed for a complete revolution of the shaft, or for a complete tri-color exposure.

Since it is desirable to turn the printing lamp 10 off after each exposure, especially since the operator might walk away and leave the machine, a switch 83 is placed in the lamp current to be operated by a cam 84 fixed to the cam shaft 43. This switch is normally biased to a closed position and is opened at the end of each complete tri-color exposure, or at the end of each complete revolution of the shaft 43 and is adapted to close the instant the shaft 43 starts to make a new exposure.

The embodiment shown in Fig. 6 utilizes the cell and filter structure shown in Fig. 1 and differs from the other embodiments already described primarily in the use of a single photoemissive type cell for integrating and measuring purposes, and in the use of an indexable tri-color filter in front of the cell. With the further exception that the use of a photoemissive type measuring cell generally requires a D. C. amplifier to operate the photoelectric relay controlling the circuit of the reversible motor connected to the rheostat, these embodiments are the same, only that certain switch operations are reversed because of the difference in the diagram layouts, and corresponding parts of the two will be designated by like reference characters.

Referring now to Fig. 6, the intensity of the printing lamp 10 is again controlled by a rheostat 17 driven by the reversible shaded-pole motor $M_P$. The circuits of the shading windings for the motor are alternately reversed three times during each exposure by the direction cam 61 connected to the cam shaft 43 driven by motor so as to reduce the lamp to low intensity prior to each exposure with a different color, and to gradually increase the intensity until the measuring cell says that enough light of the color in question is coming through the negative to make the exposure. At this time the relay made up of coil 63 and switch 59 is energized to break the motor circuit to hold the lamp at this intensity.

The composite filter disk 15 containing red, green and blue filters, R, G, and B, and R', G' and B', respectively, is normally rotated by a motor drive including a slip clutch 28 and is indexed by a spring pressed plunger 100 which is adapted to snap successively into one of three notches 101 formed in the periphery of the disk. The photoemissive cell 16 is disposed below the filter and adjacent the lens 12 so that light transmitted by the color negative 14 and passing through the one of the group of color filters $R_1$, $G_1$ and $B_1$ which is indexed into operative position strikes the cathode thereon. The photocell 16 is connected in circuit with a source of D. C. potential 102 and a D. C. amplifier 103, the output of which serves to trip the relay controlling the rupture of the circuit of the reversing motor $M_P$ when the output of the cell reaches a predetermined value. As the intensity of the light on the photocell 16 increases its resistance decreases so that more current will flow through it from the source of potential 102 to the amplifier, and the system is adjusted so that when the intensity of the light transmitted by the negative and passing through the filter over the cell reaches a value sufficient for printing purposes with that color the relay will be energized to break the circuit to the motor tending to drive the intensity of the printing lamp up.

The remainder of the printer control is the same as that shown in Fig. 8 both structurally and functionally. The cam shaft 43 is driven by the motor Ms and carries cams 76, 61, 84, 78, and 80, controlling switches 77, 60, 83, 79 and 81, respectively. The cam 42 shown in Fig. 8 is lacking from this embodiment because there is no selection of different measuring cells required since only one measuring cell 16 is used. Accordingly, as before, the cam 76 causes the shutter 50 to be moved in front of the lens during the indexing of the tri-color filter 15, during measuring of the intensity of the light transmitted by the negative and during the necessary adjustment of the intensity of the printing lamp as dictated by the cell 16, and then it allows the shutter to open and remain open for a given time to make an exposure with the color light in question.

The cam 61 alternately changes the direction of drive on the motor Mp so that at the end of an exposure with one color, the lamp 10 is driven to low intensity and is, after indexing of the filter disk, then driven in the other direction until the measuring cell 16 says that enough light is being transmitted by the negative and causes the motor circuit to be broken.

The cam 84 breaks the lamp circuit at the end of each revolution of the cam shaft 43, or at the end of a complete exposure. The cam 78 allows the filter disk 15 to be indexed at the end of each color exposure. The cam 80 cuts the circuit to the motor Ms driving the cam shaft at the end of each revolution of the shaft.

It is pointed out that, if desired, the amplifier 103 of the embodiment shown in Fig. 6 could be replaced with a galvanometer control of the type shown in Fig. 8. Such a substitution might be advantageous for the reason that the criterion of the printer adjustment is constancy of amplified photo current for each of the filter combinations. Because the photo cell current available is very small, a D. C. amplifier capable of considerable amplification is necessary and such amplifiers are quite complicated and must be adjusted from time to time, said adjustments generally requiring the services of an expert. The galvanometer arrangement, on the other hand, is essentially a mechanical amplifier for the photo current and is more stable in operation than a D. C. multi-stage amplifier for extended continuous use, although they are sensitive to, and must be protected from, shock and vibration.

The present method making color prints is not limited to the use of a light-sensitive means for integration and measuring the light transmitted by the negative, although such a system is more adapted to an automatic printer control. In Figs. 5 and 5A we have shown diagrammatically how a color densitometer, or color comparison photometer, might be used for this purpose in place of a photoelectric means, the intensity of the lamp being varied in this instance by hand, rather than by an electric motor. As before, the printer includes a light source 10 below which a color negative 14 is positioned so than an image of the negative is adapted to be projected onto the paper plane, not shown, by a lens 12. A tricolor filter disk 15″ of the type shown in Fig. 8 is rotatably mounted in front of the lens so that the red, green and blue filters thereof can be successively moved in front of the lens for exposing the color sensitive paper to red light, green and blue light in succession to make a complete exposure.

To integrate and measure the intensity of the red, green and blue light transmitted by the negative the color densitometer or color comparison photometer, indicated generally as 150 is moved into the printing beam between the negative and the filter disk 15″. This unit may include a pair of light-integrating blocks 151 and 152 which may be made of any transparent material such as glass or clear plastic (Lucite). A reduced image of substantially the entire negative 14 is thrown on the light entering face of the integrating block 151 by an optical system including a large field lens F, a mirror M and a projection lens P. Accordingly, light passing through the negative and entering the face 153 of the block passes through the block to the exit face 154 thereof, and because the light is subjected to many internal reflections from the parallel polished walls of the block in passing therethrough the total light entering the block is integrated over the exit face 154.

Adjacent the entrance face 156 of the block 152 there is positioned a standard comparison light source L. The light entering the block 152 from this source is integrated over its exit face 157 thereof by virtue of a great many internal reflections from the walls thereof. The two exit faces of the blocks 151 and 152, therefore, constitute separate comparison fields, and the exit ends of the blocks are preferably formed so that they each have two flat portions extending longitudinally of the blocks which are brought into abutting relation. The separating line between the two exit faces form a dividing line for the comparison field which is very distinct when the two fields are considerably out of match, but which substantially disappears when the two fields are in match so as to make the comparison easy and essentially independent of an accurate color conception on the part of the operator. The dividing line is indicated as 157 in Fig. 5A, which diagrammatically illustrates what the entire comparison field will look like to the observer. The field is made circular by means of a mask 158 disposed at the exit ends of the blocks, and which may consist of an opaque sheet of material with a circular hole in it.

When measuring and adjusting the intensity of the red light transmitted by the negative, a red filter 159 is slipped over the exit faces of the two blocks. The combination of the intensity of the standard light source and the transmission characteristics of this filter are adjusted in accordance with the color sensitivity of the paper and the transmission characteristics of the red printing filter movable in front of the lens so that if the intensity of the printing lamp is such that the red on the exit end of block 151 matches the red on the end of block 152, then an exposure made with the printing lamp intensity for a preselected exposure time will be given a satisfactory red exposure to the paper. The exit end of the blocks are shielded from extraneous light by a hood 160. If on looking at the comparison field it is noticed that the two individual fields don't match the operator adjusts the intensity of the printing lamp 10 manually, as by means of a rheostat 17, until the fields do match. Then the unit 150 is pulled out of the printing beam and a red exposure is made for the given time by using the lamp intensity as finally adjusted. The unit is then moved back into measuring position and the procedure is repeated with a green filter over the comparison field, and after proper intensity adjustment of the printing lamp the unit is removed and the paper is given a green exposure by using the green filter on disk 15". This step is finally repeated with a blue filter over the comparison field of the measuring unit and the exposure is made through the blue filter of disk 15", whereupon the complete exposure of the color sensitive paper is effected. To prevent the light sensitive paper from being exposed to light from the printing lamp 10 during the integrating and measuring step of the respective primary colors, the unit may be contained within a light-tight housing indicated at H in Fig. 5 and which housing may include a hinge indicated at 175 to facilitate moving the unit into and out of integrating position relative to the color negative.

It is conceded that this apparatus for making a color print is considerably slower in operation than the automatic apparatus previously described, but the principle of the method carried out is the same in all instances. It is obvious, therefore, that our method of making color prints is not dependent upon any particular type of apparatus, but can be carried out visually and manually as well as photo-electrically and automatically. If the three primary colors formed by the combined use of the "white" comparison, or standard, light L and the three filters placed over the comparison fields of the unit were mixed together it would be found that they would form a "white" light which would print the paper to gray. In other words, this system integrates the negative to gray in the same manner as the photoelectric measuring system described above.

While for purposes of convenience and flexibility of control we have preferred to measure and print with each primary color separately but in rapid sequence, it is obvious that with slight modifications in the apparatus the exposure of the three colors could be carried out simultaneously after being integrated separately; or the integrations of the three colors could be carried out simultaneously. Either of these modifications would preferably entail the use of three separate adjustable printing sources, a red one, a green one, and a blue one, above the negative, instead of a single "white" one which includes each of these primary colors which can be spectrally selected by the use of color filters as described. These three sources would be arranged to illuminate the negative simultaneously and separate red-sensitive, green-sensitive and blue sensitive cells would be arranged below the negative to integrate the same simultaneously. These separate cells would be connected to separate controls of the type described to adjust the intensity of its corresponding light source. When the three lights are properly adjusted as to intensity the shutter would be removed from in front of the lens and the paper would be exposed simultaneously to the three sources. This would necessitate using the same exposure time for each color, but this is a procedure we have found desirable anyway.

Throughout this specification and claims when we refer to the printing source as being "white" we mean it includes the three primary colors, red, green, and blue. On the other hand, when we refer to the negative transmitted intensities of the three colors as being adjusted to values such that if mixed together they would make a "white" light, the term "white" is used to mean that the adjusted transmitted intensity of the three colors are substantially the same in value. Consequently, the paper when successively exposed to these three adjusted intensities is affected substantially the same as if exposed to a "white" light which would be formed by a mixture of these three colors.

It is further pointed out that while we have described the timed operation of the several parts of the printer control as effected by cams, it will be obvious to those skilled in the art that the same results, and particularly the exposure time of the separate colors, could be controlled by the use of mechanical or electrical timers. The cam controlled arrangement is preferable, however, because it lends itself to a more simple arrangement of parts.

Although from the standpoint of simplicity in operation it is preferable to base the exposures on the constant-time variable-intensity principle, it will be readily understood by those skilled in the art that with little or no modification the variable-time constant-intensity principle would be used. For instance, the intensity of the red beam transmitted by the negative could be measured by the photo cell, and then instead of adjusting the intensity of the printing source until this intensity is equal to a given, or preselected value, based on a given exposure time, the exposure time could be varied in accordance with the intensity as measured so that the product of the intensity and exposure time would produce the correct exposure of the printing material for the color beam in question. The main drawback to this modification is that the exposure involves two variables, instead of one, and it is therefore not adapted for automatic operation.

While we have shown and described certain specific embodiments of our invention, we are aware that many modifications thereof are possible. Our invention, therefore, is not to be limited to the specific structural details shown and described, but is intended to cover all modifications coming within the scope of the appended claims.

Having thus described our invention, what we claim as new and desire to secure by Letters Patent of the United States is:

1. In a color printer for making a color print from a color negative, the combination of means for holding a negative in a flat condition; means for uniformly illuminating said negative with the three primary colors; means for individually and spatially integrating, and measuring the intensity of, each of the primary colors in the beam transmitted by said entire negative and adapted to indicate when the intensity of each color reaches a preselected value; means for varying the intensity of each of the primary colors in the negative transmitted beam; means for setting said last-mentioned means in operation; and means for automatically stopping said intensity varying means in response to the indication given by said integrating and measuring means that the intensity of a color equals said preselected value.

2. A color printer according to claim 1 in which the negative illuminating means is a "white" light; and including means for spectrally selecting the primary colors from the negative transmitted beam for measurement as to intensity.

3. A color printer according to claim 1 in which the negative illuminating means is a "white" light; and including interchangeable red, green and blue filters insertable into said negative transmitted beam for measurement as to intensity.

4. A color printer according to claim 1, including electro-optical means for spatially integrating and measuring the intensity of each of the primary colors in the negative transmitted beam.

5. A color printer according to claim 1 in which the negative illuminating means is a "white" light; a light-sensitive cell for spatially integrating and measuring the intensity of the primary colors in the negative transmitted beam; and interchangeable red, green and blue filters movable into said beam in covering relation with said cell.

6. A color printer according to claim 1 in which the negative illuminating means is a "white" light; a plurality of light-sensitive cells situated below said negative so as to integrate the negative spatially; red, green and blue filters fixed in covering relation with different ones of said cells; an amplifier circuit for amplifying the output of said cells; and means for individually and successively connecting cells covered by the same colored filter into said amplifier circuit for measuring the intensity of each of the primary colors in the negative transmitted beam.

7. A color printer according to claim 1 in which the negative illuminating means is a "white" light; a projection lens for projecting an image of said negative; means for positioning a sheet of printing material in the image plane of said lens; interchangeable red, green and blue filters movable into the printing beam projected by said lens; and means for successively moving said filters into operative position in accordance with the integration and measurement of the intensity of the respective primary colors in the negative transmitted beam.

8. A color printer according to claim 1 in which the negative illuminating means is a "white" light; and in which the means for integrating and measuring the intensity of the primary colors in the negative transmitted beam includes three light-sensitive cells of the barrier layer type arranged to spatially scan the entire negative; one of said cells being responsive to only red light another to only green light and the third to only blue light.

9. In a color printer for making a color print from a color negative, the combination of means for holding a negative in a flat condition means for uniformly illuminating said negative, comprising a light source including the three primary colors; a lens for projecting an image of said negative; means for feeding a sheet of color sensitive printing material into the image plane of said lens; electro-optical mean for integrating and measuring the intensity of each of the primary colors in the negative-transmitted beam and adapted to have a given output when the intensity of the respective color beams equal a preselected value; means for selectively rendering said electro-optical means responsive to only individual ones of said primary colors; means for varying the intensity of said light source to alter the intensity of said primary colors in the negative-transmitted beam; and electric motor for driving said last-mentioned means, means for starting said motor; means operated by said given output of said electro-optical means for automatically stopping said motor when the intensity of the selected primary color in the transmitted beam equals said preselected value; means for successively splitting the transmitted beam striking the printing plane into the three primary colors for exposure purposes; and means synchronizing said last-mentioned means with the means for selectively changing the responsiveness of the electro-optical means so that at any time the printing beam striking the paper will be the same primary color as that being integrated and measured by said electro-optical means.

10. A color printer according to claim 9 in which the means for splitting the printing beam striking the printing plane comprises separate red, green and blue filters adapted to be moved into the printing beam; and means for indexing said filters into the beam in succession.

11. A color printer according to claim 9 in which said electric motor is reversible; and means responsive to the activation of said electro-optical means for choosing the direction of drive of said motor and starting it.

12. A color printer according to claim 9 in which said electro-optical means includes a photo-electric cell arranged to be energized by light passing through said negative; separate red, green and blue filters adapted to be moved in front of said cell; separate red, green and blue filters adapted to be moved into the printing beam passing through said lens; and means for successively moving corresponding colored filters in front of said cell and into said printing beam at the same time.

13. A color printer according to claim 9 in which the means for varying the intensity of said light source comprises a variable rheostat in circuit with said source, said rheostat normally biased of the source to a value which will not effect an appreciable exposure of the printing material with the least dense negative which might be encountered in a normal line of work.

14. A color printer according to claim 9 in which the means for varying the intensity of said light source comprises a variable rheostat in circuit with said source; a reversible electric motor for driving said rheostat in both directions; means responsive to the activation of said electro-optical means for choosing the direction of drive of the motor and starting it.

15. A color printer according to claim 9 and including a shutter movable into and out of the printing beam passing through said projection lens; and means for moving said shutter into operative position and holding it in such position during the time any one of the primary colors in said printing beams is being integrated and measured and the intensity of the source is being adjusted; and means for moving said shutter to its in-operative position when the intensity of the source has been adjusted and holding it in its inoperative position for a given time to effect a desired exposure of the printing material.

16. A color printer according to claim 9 in which the means for varying the intensity of said light source comprises a rheostat in circuit with said source; and a servo-control mechanism responsive to the output of said electro-optical means for causing an adjustment of said rheostat and in the proper direction.

17. A color printer according to claim 9 in which the electro-optical means includes a photo-electric cell disposed outside of the printing beam but adapted to integrate the light transmitted by the negative; a pair of movable filter holders each containing a red, a green and a blue filter in spaced relation; one arranged to successively move the different filters into the beam projected by the lens, and the other arranged to successively move the different filters in front of the photo-electric cell; means for intermittently driving said filter holders so that at any time a filter of the same color will be in the projected beam and in front of the photo-electric cell.

18. A color printer according to claim 9 in which said electro-optical means comprises a circuit including an amplifier for an electric current and three barrier layer type photo-electric cells arranged outside of the printing beam but adapted to spatially integrate the negative, a red filter fixed over one of the cells, a green filter fixed over another of the cells and a blue filter fixed over the third cell; separate red, green and blue filters movable into the beam passing through said lens; and synchronized means for successively cutting different ones of said filtered cells into said circuit and successively moving said filters into the printing beam, whereby at all times the color of the filter in the printing beam will correspond to the color sensitivity of the cell connected into said circuit.

19. A color printer according to claim 9 in which the means for varying the intensity of the light source includes a reversible motor which when driven in one direction increases the resistance in the circuit to reduce the intensity of the source and when driven in the other direction cuts resistance out of the circuit to increase the intensity of the source; a reversing switch in the motor circuit; a shutter movable into and out of the beam projected by said lens, means for moving said shutter between its two positions and means for simultaneously causing said shutter to move into the projected beam and throwing said reversing switch to a position wherein the motor drives in a direction to decrease the intensity of said source until it reaches a given value then simultaneously causing the shutter to be removed from said beam and throwing the reversing switch to its other position.

20. In a color printer for making a color print from a color negative, the combination of means for holding a negative; means for uniformly illuminating said negative, comprising a light source including the three primary colors; a lens for projecting an image of said negative; means for feeding a sheet of color sensitive printing material into the image plane of said lens; a light sensitive cell disposed to integrate and measure light transmitted by said negative; a red filter disposed in front of the lens; a red filter disposed in front of said cell; means for varying the intensity of said light source until the intensity of the red printing beam is a preselected value, and including an electric motor; means for starting said motor; and means controlled by the output of said light sensitive cell for automatically stopping said motor when the intensity of the red printing beam is a preselected value.

21. A color printer according to claim 20 in which said last-mentioned means includes an amplifier for the output of the light sensitive cell; said amplifier adapted to break the motor circuit when the output of said cell is a given amount in accordance with said preselected value of intensity.

22. A color printer according to claim 20 in which said last-mentioned means includes an amplifier of the null type which is adapted to energize said motor when there is any difference in potential on the feed-in side thereof and is adapted to break the motor circuit when there is no difference in potential on the feed-in side thereof; and a comparison source of potential, based on said preselected value of intensity connected in bucking relation to said light sensitive cell; said cell and comparison source of potential connected to the feed-in side of said amplifier.

23. A color printer according to claim 20 in which said last-mentioned means includes a moving-coil instrument connected in circuit with said cell a given deflection of which causes the circuit of said motor to be broken.

24. In a color printer for making a color print from a color negative the combination of means for holding a negative in a flat condition; means for uniformly illuminating said negative, and comprising a light source including the three primary colors; a lens for projecting an image of said negative; means for feeding a sheet of color sensitive printing material into the image plane of said lens; electro-optical means including a light-sensitive cell located below said negative and outside of the field of said lens for measuring the intensity of the light transmitted by said negative; separate red, green and blue filters adapted to be moved in front of the lens for exposing the printing material to red, green and blue light successively; means for rendering said electro-optical means successively responsive to each of the three primary colors individually; means for moving said separate filters in front of said lens and altering the color responsiveness of said electro-optical means in synchronism so that the electro-optical means is adapted to measure the intensity of the same color in the negative transmitted beam that is to be used for making an exposure; means for starting the intensity varying means after one of the filters has been moved into position in front of the lens; means operated by the output of said electro-optical means for stopping said intensity varying means when the intensity of said transmitted color reaches said preselected value; means for moving a shutter in front of said lens after the intensity of the light source has been adjusted to effect an exposure of the printing material with said color.

25. A color printer according to claim 24 in which the separate red, green and blue filters are mounted on a movable support and are spaced apart by opaque areas which act as shutters for the lens; each of said filters and opaque areas being substantially longer in their direction of travel than the diameter of the lens; and means for continuously moving said holder so as to successively move said filters and opaque areas in front of the lens at such a speed, in accordance with the dimension of said filters and opaque areas, that the time it takes for each filter to move across said lens determines the exposure period for that particular color, and the time it takes for each opaque area to pass in front of the lens permits measurement of the intensity of the succeeding color transmitted by said negative and adjustment of the intensity of the light source to make the transmitted intensity of the succeeding color transmitted by said negative and adjustment of the intensity of the light source to make the transmitted intensity equal to said preselected value.

26. A color printer according to claim 24 in which the separate red, green and blue filters are mounted in spaced relation arcuately of a disk rotatably mounted eccentrically of said lens; and means for intermittently advancing said disk to successively move different ones of said filters in front of said lens, said means including a constantly driven shaft; a tendency drive between said shaft and filter disk; a pawl normally moved into positive engagement with spaced recesses in said disk to stop and positively hold the disk with a filter before the lens; a solenoid for retracting said pawl from engagement with any one of said recesses; and means for momentarily energizing said solenoid after an exposure with the color light transmitted by the filter in operative position has been completed and before the intensity of the light source has been adjusted in accordance with the transmitted intensity of the color to be provided by the succeeding filter on the disk.

27. In a color printer for making a color print from a color negative, the combination of means for holding a negative in a flat condition; means for uniformly illuminating said negative, and comprising a light source including the three primary colors; a lens for projecting an image of said negative; means for feeding a sheet of color sensitive paper into the image plane of said lens; separate red, green and blue filters and means for feeding them individually and successively in front of said lens for exposing the printing material to each of these colors; means for integrating and comparing the intensity of the individual primary colors transmitted by said negative with a preselected value, and comprising a densitometer the standard of which comprises a light source of one of the primary colors whose intensity is equal to said preselected value; means for spectrally selecting and integrating the individual primary colors transmitted by said negative; optical means for combining the two sources into a comparison field for visual inspection; and means for adjusting the intensity of the printing light source until the intensity of the transmitted primary color in question equals said preselected value as evidenced by the comparison field of the densitometer becoming matched; a shutter movable into and out of adjustment of the transmitted intensity thereof, and means normally moving said shutter in front of the lens to cut off the printing beam during the change of filters and the adjustment of the intensity of the light source.

CLIFTON M. TUTTLE.
FORDYCE M. BROWN.

REFERENCES CITED

The following references are of record in the file of this patent:

UNITED STATES PATENTS

| Number | Name | Date |
|---|---|---|
| 2,161,371 | Mees | June 6, 1939 |
| 2,231,669 | Hall | Feb. 11, 1941 |
| 2,256,397 | Luboshez | Sept. 16, 1941 |
| 2,269,161 | Morse | Jan. 6, 1942 |
| 2,388,842 | Hanson | Nov. 13, 1945 |